United States Patent
Tiedtke et al.

(10) Patent No.: US 11,855,472 B2
(45) Date of Patent: Dec. 26, 2023

(54) MOBILE POWER SYSTEM WITH BIDIRECTIONAL AC-DC CONVERTER AND RELATED PLATFORMS AND METHODS

(71) Applicant: COHELIOS, LLC, Chuluota, FL (US)

(72) Inventors: Alex Tiedtke, Winter Park, FL (US); David Bateman, Chuluota, FL (US)

(73) Assignee: COHELIOS, LLC, Oviedo, FL (US)

( * ) Notice: Subject to any disclaimer, the term of this patent is extended or adjusted under 35 U.S.C. 154(b) by 106 days.

(21) Appl. No.: 17/551,760

(22) Filed: Dec. 15, 2021

(65) Prior Publication Data

US 2022/0109317 A1 Apr. 7, 2022

Related U.S. Application Data

(63) Continuation of application No. 16/701,517, filed on Dec. 3, 2019, now Pat. No. 11,228,190.

(60) Provisional application No. 62/775,041, filed on Dec. 4, 2018.

(51) Int. Cl.
| | |
|---|---|
| *H02J 7/00* | (2006.01) |
| *B60R 16/033* | (2006.01) |
| *B60L 53/62* | (2019.01) |
| *B60L 58/12* | (2019.01) |
| *B60L 58/16* | (2019.01) |
| *B60L 5/24* | (2006.01) |

(52) U.S. Cl.
CPC .............. *H02J 7/0068* (2013.01); *B60L 5/24* (2013.01); *B60L 53/62* (2019.02); *B60L 58/12* (2019.02); *B60L 58/16* (2019.02); *B60R 16/033* (2013.01); *H02J 7/005* (2020.01); *H02J 7/007* (2013.01); *H02J 7/0048* (2020.01); *H02J 7/007182* (2020.01); *H02J 7/007194* (2020.01); *H02J 2207/20* (2020.01); *H02J 2207/40* (2020.01)

(58) Field of Classification Search
CPC ........ H02J 7/0068; H02J 7/0048; H02J 7/005; H02J 7/007; H02J 2207/20; B60R 16/033
See application file for complete search history.

(56) References Cited

U.S. PATENT DOCUMENTS

| | | | |
|---|---|---|---|
| 4,296,461 | A | 10/1981 | Mallory et al. |
| 5,621,299 | A | 4/1997 | Krall |
| 5,663,628 | A | 9/1997 | Fujii |
| 5,760,570 | A | 6/1998 | Nagai et al. |
| 5,964,309 | A | 10/1999 | Kimura et al. |
| 6,072,299 | A | 6/2000 | Kurle et al. |
| 6,118,248 | A | 9/2000 | Gartstein et al. |

(Continued)

*Primary Examiner* — Daniel Cavallari
(74) *Attorney, Agent, or Firm* — Allen, Dyer, Doppelt + Gilchrist, PA (57) ABSTRACT

A mobile power system may include a bidirectional AC-DC converter configured to convert a grid AC signal to a power limited DC charging signal with a threshold level, a battery module configured to provide a DC power signal, and a controller coupled to the battery module and the bidirectional AC-DC converter and configured to selectively switch the bidirectional AC-DC converter between a first state and a second state. The first state may include, when a load power level is less than the threshold level, concurrently charging the battery module using the power limited DC charging signal and delivering the grid AC signal to a load. The second state may include, when the load power level is greater than the threshold level, concurrently converting the DC power signal with the bidirectional AC-DC converter into a battery AC signal for delivery to the load, and delivering the grid AC signal to the load.

20 Claims, 4 Drawing Sheets

(56) References Cited

U.S. PATENT DOCUMENTS

| | | |
|---|---|---|
| 6,326,767 B1 | 12/2001 | Small et al. |
| 6,348,277 B1 | 2/2002 | Faris et al. |
| 6,680,600 B2 | 1/2004 | Emori et al. |
| 6,731,022 B2 | 5/2004 | Silverman |
| 6,811,903 B2 | 11/2004 | Vartak et al. |
| 6,936,994 B1 | 8/2005 | Gimlan |
| 7,009,401 B2 | 3/2006 | Kinoshita et al. |
| 7,589,500 B2 | 9/2009 | Johnson et al. |
| 7,667,340 B2 | 2/2010 | Wadle et al. |
| 7,948,207 B2 | 5/2011 | Scheucher |
| 8,476,862 B2 | 7/2013 | Matsumoto |
| 8,896,315 B1 | 11/2014 | Davies |
| 9,194,919 B2 | 11/2015 | Uesaka |
| 9,490,510 B2 | 11/2016 | Takahashi et al. |
| 9,559,384 B2 | 1/2017 | Takahashi |
| 9,649,950 B2 | 5/2017 | Katayama et al. |
| 10,454,286 B2 | 10/2019 | Torkestani et al. |
| 11,070,073 B2 | 7/2021 | Tiedtke et al. |
| 2005/0249989 A1 | 11/2005 | Pearson |
| 2006/0083955 A1 | 4/2006 | Kanouda et al. |
| 2006/0122657 A1 | 6/2006 | Deal et al. |
| 2006/0244421 A1 | 11/2006 | Narendran et al. |
| 2007/0178376 A1 | 8/2007 | Fujikawa et al. |
| 2007/0184339 A1 | 8/2007 | Scheucher |
| 2007/0212596 A1 | 9/2007 | Nebrigic et al. |
| 2007/0229034 A1 | 10/2007 | Tatebayashi et al. |
| 2008/0007200 A1 | 1/2008 | Minamiura et al. |
| 2008/0122290 A1 | 5/2008 | Li et al. |
| 2008/0224667 A1 | 9/2008 | Tanaka et al. |
| 2008/0252254 A1 | 10/2008 | Osada |
| 2009/0096399 A1 | 4/2009 | Chen et al. |
| 2009/0115374 A1 | 5/2009 | Noda |
| 2010/0097035 A1 | 4/2010 | Buchholz et al. |
| 2010/0102778 A1 | 4/2010 | Otsu et al. |
| 2010/0181966 A1 | 7/2010 | Sakakibara |
| 2010/0327818 A1 | 12/2010 | Taniguchi et al. |
| 2011/0006727 A1 | 1/2011 | Blau et al. |
| 2011/0012560 A1 | 1/2011 | Sakakibara |
| 2011/0057611 A1 | 3/2011 | Nakaso et al. |
| 2011/0078470 A1 | 3/2011 | Wang et al. |
| 2011/0174084 A1 | 7/2011 | West et al. |
| 2011/0193532 A1 | 8/2011 | Iwanaga et al. |
| 2011/0254508 A1 | 10/2011 | Sakakibara |
| 2011/0313613 A1 | 12/2011 | Kawahara et al. |
| 2012/0040224 A1 | 2/2012 | Reischmann et al. |
| 2012/0187897 A1 | 7/2012 | Lenk et al. |
| 2012/0209441 A1 | 8/2012 | Hirata et al. |
| 2012/0268074 A1 | 10/2012 | Cooley et al. |
| 2012/0274145 A1 | 11/2012 | Taddeo |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0090795 A1 | 4/2013 | Luke et al. |
| 2013/0098646 A1 | 4/2013 | Funabashi et al. |
| 2013/0134926 A1 | 5/2013 | Yoshida |
| 2013/0181526 A1 | 7/2013 | Iwasaki et al. |
| 2013/0249446 A1 | 9/2013 | Kumagai |
| 2013/0322488 A1 | 12/2013 | Yazami et al. |
| 2014/0077595 A1 | 3/2014 | Kakuya et al. |
| 2014/0176076 A1 | 6/2014 | Momo et al. |
| 2014/0184162 A1 | 7/2014 | Takahashi et al. |
| 2014/0184172 A1 | 7/2014 | Momo et al. |
| 2014/0197797 A1 | 7/2014 | Yamazaki |
| 2014/0197802 A1 | 7/2014 | Yamazaki |
| 2014/0285022 A1 | 9/2014 | Dao et al. |
| 2014/0354212 A1 | 12/2014 | Sugeno et al. |
| 2015/0046012 A1 | 2/2015 | Chen et al. |
| 2015/0280290 A1 | 10/2015 | Saha et al. |
| 2015/0293182 A1 | 10/2015 | Tajima et al. |
| 2015/0295448 A1 | 10/2015 | Sugeno et al. |
| 2015/0349387 A1 | 12/2015 | Inaba et al. |
| 2015/0357840 A1 | 12/2015 | Okada |
| 2015/0372279 A1 | 12/2015 | Li |
| 2015/0380787 A1 | 12/2015 | Ishii et al. |
| 2016/0043591 A1 | 2/2016 | Oakley, Jr. |
| 2016/0049813 A1 | 2/2016 | Takizawa et al. |
| 2016/0105042 A1 | 4/2016 | Taylor et al. |
| 2016/0134160 A1 | 5/2016 | Schultz et al. |
| 2016/0146895 A1 | 5/2016 | Yazami |
| 2016/0241057 A1 | 8/2016 | Yang |
| 2017/0033338 A1 | 2/2017 | OHora |
| 2017/0133879 A1 | 5/2017 | Eckhardt et al. |
| 2017/0271889 A1 | 9/2017 | Sugeno et al. |
| 2017/0279170 A1 | 9/2017 | OHora |
| 2017/0301959 A1 | 10/2017 | Takahashi et al. |
| 2017/0338668 A1 | 11/2017 | Sada et al. |
| 2017/0373520 A1 | 12/2017 | Sugeno et al. |
| 2018/0062197 A1 | 3/2018 | Thiel et al. |
| 2020/0171971 A1 | 6/2020 | Tiedtke et al. |

MOBILE POWER SYSTEM WITH BIDIRECTIONAL AC-DC CONVERTER AND RELATED PLATFORMS AND METHODS

RELATED APPLICATION

This application is a continuation of pending application Ser. No. 16/701,517 filed Dec. 3, 2019, which is based upon prior filed copending Application No. 62/775,041 filed Dec. 4, 2018, the entire subject matter of these applications is incorporated herein by reference in its entirety.

TECHNICAL FIELD

The present disclosure relates to the field of power systems, and, more particularly, to mobile vehicle power systems and related methods.

BACKGROUND

The electrical requirements for the automotive, truck, boat and recreational vehicle industry have, with few exceptions, become standardized using twelve volt direct current (DC) electrical systems and using one or more twelve volt batteries wired in parallel for storage. Most vehicles have twelve volt lights, twelve volt starter motor and twelve volt ancillary motors for, such things as windshield wipers, electric door locks and power windows. The twelve volt systems work well and twelve volt fractional horsepower motors are ideal for intermittent use as the current draw for these small motors is not great. Twelve volt engine starter motors produce very high torque for engine starting, but at a very high current draw, often in the range of 400 amps. These motors can only run for a few minutes before they drain the vehicle battery bank and/or burn up.

The twelve volt base electrical systems in vehicles have precluded the development of practical and efficient electrically driven equipment, such as air compressors, hydraulic pumps, air conditioners and vacuum systems to be mounted on service, food trucks, recreational vehicle, or over the road vehicles. Invariably, in applications where the vehicle is laden with these power demands, these devices are either powered by the onboard internal combustion engine of the vehicle or by a separate internal combustion generator.

Internal combustion approaches are effective in providing the needed energy for the application, but also come with distinct drawbacks. First and foremost, internal combustion approaches are loud and disruptive to some applications, and the engines must be constantly supplied with fuel that is inherently dangerous. Additionally, internal combustion approaches release pollution into the atmosphere and include little if any environmental controls on the exhaust. Internal combustion engines also must undergo routine maintenance to assure reliability.

In some stationary applications (e.g. food trucks), the vehicle's power demands can be supplied with grid power (i.e. shore power). In this approach, the vehicle has a cord that is plugged into a power receptacle, and the vehicle draws power from the grid. Often, the connection is 240 Volts AC, which is not always readily available.

In some approaches, the vehicle is powered by a grid power cord, a generator, and a battery pack. When the vehicle is attached to grid power, the electrical load and battery charging is handled by that source. When, as is often the case for mobile applications, there is no grid power available, the generator provides power. In these applications, the batteries, while useful, can only charge or discharge, and when in use are the sole source of power. They typically cannot be charged while they are in use. Conversely, while the generator and/or grid power are connected, the batteries are being charged and therefore cannot be used at all, and the user winds up being dependent on the unreliable availability of grid power or a problematic generator for any prolonged power usage.

SUMMARY

Generally, a mobile power system may include a bidirectional alternating current-direct current (AC-DC) converter configured to convert a grid AC signal to a power limited DC charging signal with a threshold level, a battery module configured to provide a DC power signal, and a controller coupled to the battery module and the bidirectional AC-DC converter and configured to selectively switch the bidirectional AC-DC converter between a first state and a second state. The first state may include, when a load power level is less than the threshold level, concurrently charging the battery module using the power limited DC charging signal and delivering the grid AC signal to a load. The second state may include, when the load power level is greater than the threshold level, concurrently converting the DC power signal with the bidirectional AC-DC converter into a battery AC signal for delivery to the load, and delivering the grid AC signal to the load.

Moreover, the controller may be configured to selectively switch the bidirectional AC-DC converter between a third state, and a fourth state. The third state may comprise, when the battery module is fully charged, and when the load power level is less than the threshold level, delivering the grid AC signal to the load and placing the bidirectional AC-DC converter in a stand-by state. The fourth state may comprise when the power limited DC charging signal is unavailable, converting the DC power signal with the bidirectional AC-DC converter into the battery AC signal for delivery to the load.

In some embodiments, the mobile power system may further comprise first and second switching circuits coupled between the battery module and the bidirectional AC-DC converter. Each of the first switching circuit and the second switching circuit may include a first switch, and a diode pair coupled in parallel to the first switch. The diode pair may comprise a pair of Zener diodes each having respective cathode terminals coupled together. Each of the first switching circuit and the second switching circuit may comprise a second switch and a resistor coupled in series. The second switch and the resistor may be coupled in parallel to the first switch. Each of the first switching circuit and the second switching circuit may comprise a current limiting element coupled between the battery module and the first switch.

Also, the load may comprise a plurality of loads, and the mobile power system may include an AC distribution circuit coupled to the bidirectional AC-DC converter and configured to deliver a plurality of AC signals respectively to the plurality of loads. The controller may comprise a battery management device configured to monitor a plurality of parameters related to the battery module. The plurality of parameters may comprise a total voltage value, voltage values of individual battery cells, a temperature value, a state of charge (SOC) value, a state of health (SOH) value, and a current value.

Another aspect is directed to a mobile vehicle platform comprising a vehicle body, a plurality of loads carried by the vehicle body, and a mobile power system carried by the vehicle body and powering the plurality of loads. The mobile power system may include a bidirectional AC-DC converter configured to convert a grid AC signal to a power limited DC charging signal with a threshold level, a battery module configured to provide a DC power signal, and a controller coupled to the battery module and the bidirectional AC-DC converter and configured to selectively switch the bidirectional AC-DC converter between a first state and a second state. The first state may include, when a load power level is less than the threshold level, concurrently charging the battery module using the power limited DC charging signal and delivering the grid AC signal to the plurality of loads. The second state may comprise, when the load power level is greater than the threshold level, concurrently converting the DC power signal with the bidirectional AC-DC converter into a battery AC signal for delivery to the plurality of loads, and delivering the grid AC signal to the plurality of loads.

Yet another aspect is directed to a method for making a mobile power system. The method may include coupling a bidirectional AC-DC converter configured to convert a grid AC signal to a power limited DC charging signal with a threshold level, coupling a battery module configured to provide a DC power signal, and coupling a controller to the battery module and the bidirectional AC-DC converter and configured to selectively switch the bidirectional AC-DC converter between a first state and a second state. The first state may include, when a load power level is less than the threshold level, concurrently charging the battery module using the power limited DC charging signal and delivering the grid AC signal to the plurality of loads. The second state may comprise, when the load power level is greater than the threshold level, concurrently converting the DC power signal with the bidirectional AC-DC converter into a battery AC signal for delivery to the plurality of loads, and delivering the grid AC signal to the plurality of loads.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 1:
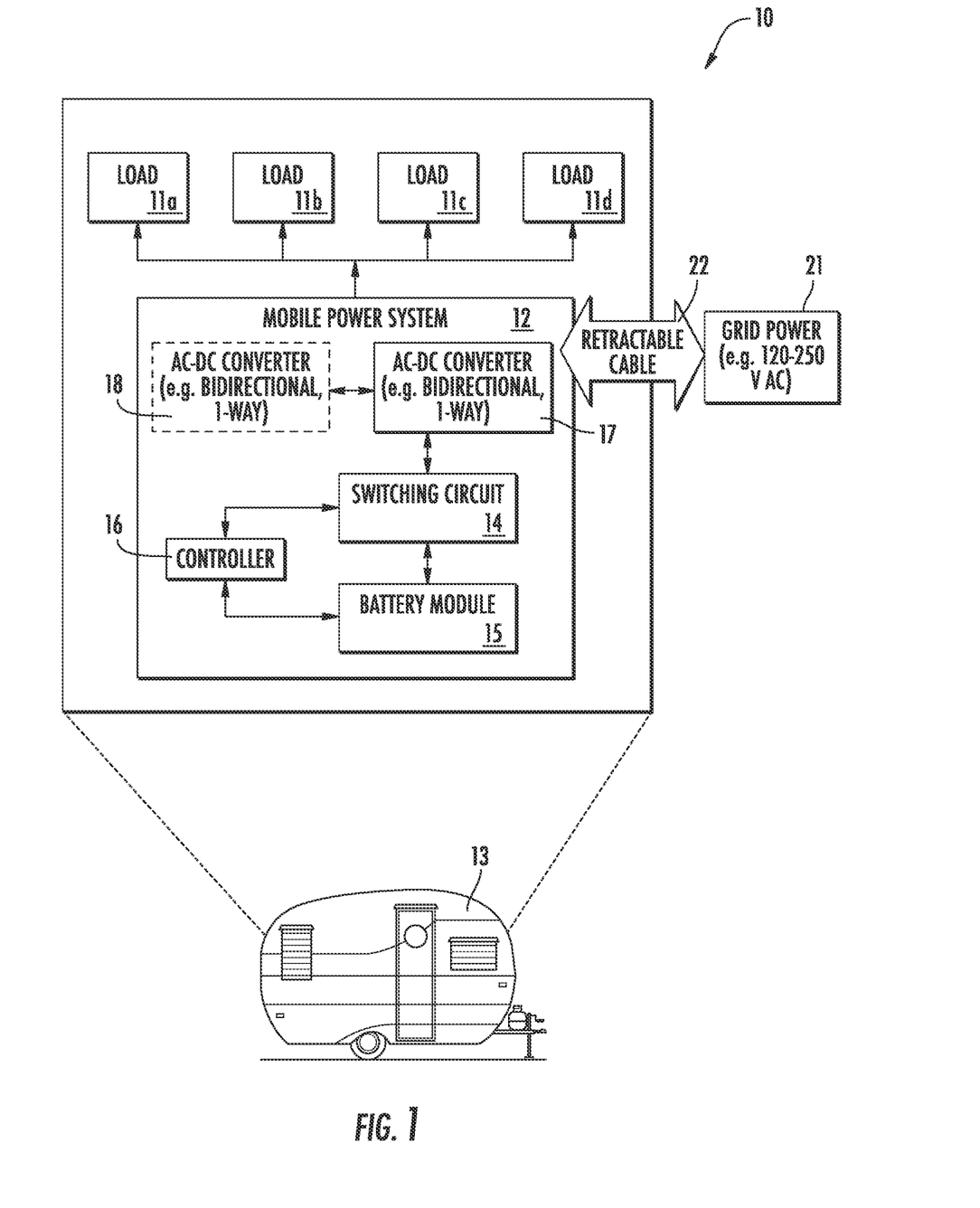
FIG. 1 is a schematic diagram of a mobile vehicle platform, according to the present disclosure.

Referring initially to FIG. 1, a mobile vehicle platform 10 according to the present disclosure is now described. The mobile vehicle platform 10 illustratively includes a vehicle body 13, and a mobile power system 12 carried by the vehicle body. In the illustrated embodiment, the vehicle body 13 is a recreational vehicle. Of course, in other embodiments, the vehicle body 13 may comprise a trailer, a food truck vehicle, or a mobile entertainment vehicle, such a mobile escape room.

The mobile vehicle platform 10 illustratively includes a plurality of loads 11*a*-11*d* carried by the vehicle body 13 and powered by the mobile power system 12. For example, the plurality of loads 11*a*-11*d* may comprise an air compressor, lighting devices, 12 Volt lighting, games, hydraulic pumps, video screens, air conditioning units, and computing equipment.

The mobile power system 12 illustratively includes one or more AC-DC converters 17-18 (second converter is optional and indicated with dashed lines), a grid power connection 21, and a retractable cable 22 coupled between the one or more AC-DC converters and the grid power connection. The mobile power system 12 illustratively includes a switching circuit 14 coupled to the one or more AC-DC converters 17-18, a battery module 15 coupled to the switching circuit, and a controller 16 coupled to the switching circuit and the battery module.

In some embodiments, the battery module 15 may comprise a bank of Lithium Ion battery cells. Each of the one or more AC-DC converters 17-18 may comprise one or more of an AC to DC converter, a DC to AC converter, or a bidirectional AC-DC converter.

The controller 16 is configured to cooperate with the switching circuit 14 to control the flow of current into and from the battery module 15. Advantageously, the switching circuit 14 may enable the battery module 15 to both be charged and provide power for the mobile vehicle platform 10. It should be appreciated that the mobile vehicle platform 10 shown in FIG. 1 is an illustrative example, and the mobile vehicle platform may comprise the mobile power system embodiments 112, 212, 312 (See FIGS. 2-4) disclosed herein.

Although not shown, the mobile power system 12 may comprise a command interface coupled to the controller 16. The command interface may include a plurality of command functions for the user to control operation of the mobile power system 12. Also, the command interface may include a status dashboard providing the current operating state of the mobile power system 12. For example, the command interface may comprise a Raspberry Pi microcontroller, as available from the Raspberry Pi Foundation of Cambridge, United Kingdom. Also, in some embodiments, the command interface may be accessible via a local wireless area network (WLAN) connection. Indeed, in some embodiments, the user may use an associated mobile wireless communications device to monitor and/or control the command interface mobile power system 12.

Figure 2:
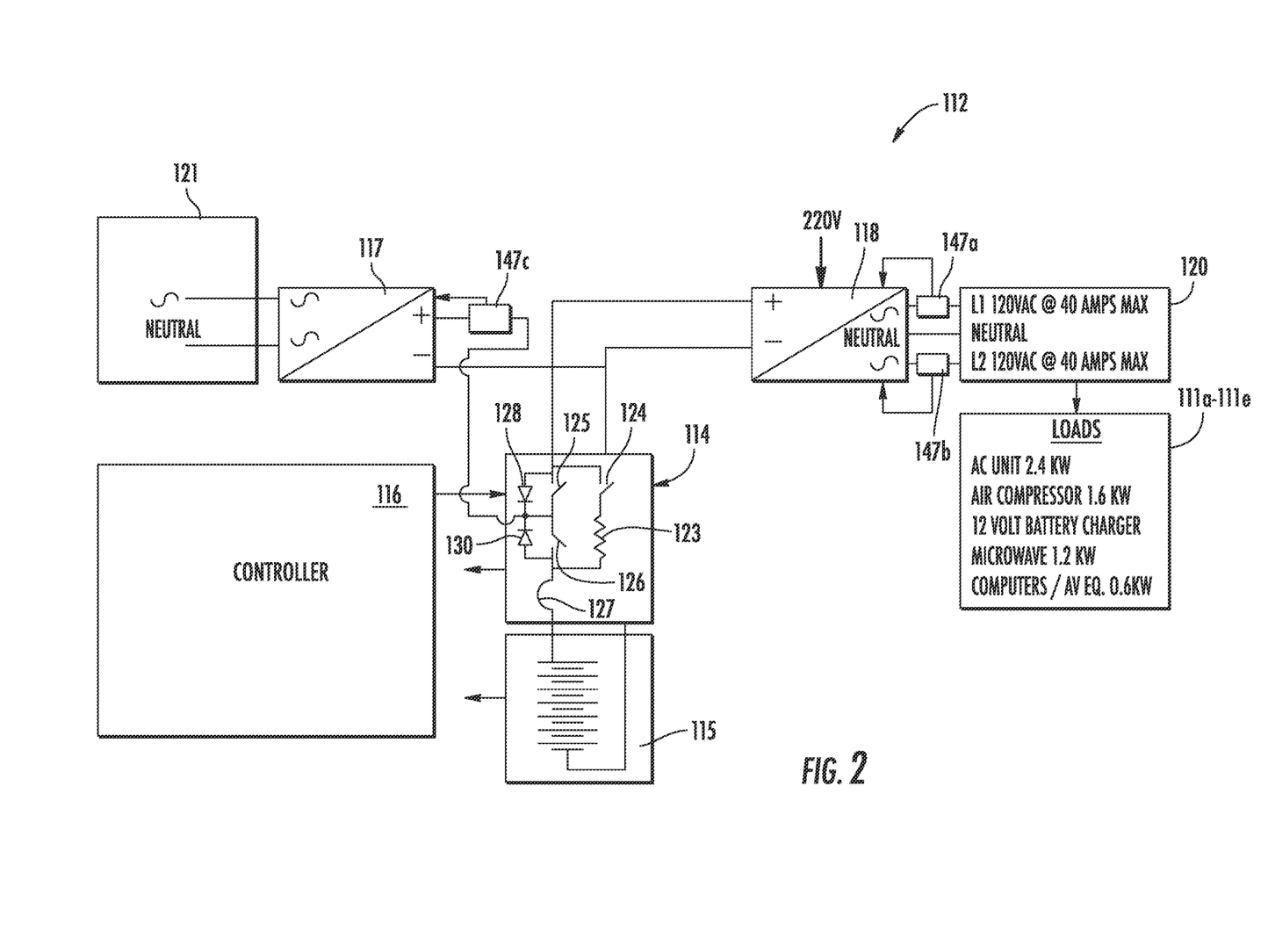
FIG. 2 is a schematic diagram of a mobile power system, according to a first embodiment the present disclosure.

Referring now additionally to FIG. 2, another embodiment of the mobile power system 112 is now described. In this embodiment of the mobile power system 112, those elements already discussed above with respect to FIG. 1 are incremented by 100 and most require no further discussion herein. This embodiment differs from the previous embodiment in that this mobile power system 112 illustratively includes an AC-DC converter 117 configured to convert a grid AC signal to a power limited DC charging signal, and a DC-AC converter 118 coupled to the AC-DC converter. In this embodiment, the grid power connection 121 illustratively includes a standard 120 Volt AC plug (e.g. power limited to 13 Amp maximum).

The mobile power system 112 illustratively includes a battery module 115 configured to provide a DC power signal, and a switching circuit 114 coupled between the battery module, and the AC-DC converter 117 and the DC-AC converter 118. The switching circuit 114 illustratively includes a first switch 125, and a first diode 128 coupled in parallel to the first switch.

It should be noted that the first diode 128 is optional. In embodiments that include the first diode 128, the DC-AC converter 118 may comprise a two-way converter (i.e. it can convert AC to DC additionally), and is coupled to a 220 Volt AC input.

Moreover, the switching circuit 114 illustratively includes a second diode 130 coupled to the first diode 128, a second switch 126 coupled in parallel to the second diode, and a third switch 124 and a resistor 123 coupled in series. The third switch 124 and the resistor 123 are illustratively coupled in parallel to the first switch 125 and the second switch 126. The switching circuit 114 illustratively includes a current limiting element 127 (e.g. 150 Amp fuse/circuit breaker) coupled between the battery module 115 and the second switch 126. Also, the first diode 128 and the second diode 130 have respective cathode terminals coupled together, and also coupled between the first switch 125 and the second switch 126.

The mobile power system 112 illustratively includes a controller 116 coupled to the battery module 115 and the switching circuit 114. The controller 116 is configured to selectively switch the switching circuit 114 between a first state, a second state, and a third state based upon a threshold voltage value from the battery module. The first state comprises alternatively one of concurrently charging the battery module 115 using the power limited DC charging signal and routes the DC power signal to the DC-AC converter 118, or providing the DC power signal using the battery module 115 without the power limited DC charging signal, i.e. when grid power in unavailable. In other words, the first state is normal operation, and in the first state, the first, second, and third switches 124-126 are all closed.

The second state relates to a battery under voltage condition (i.e. one or more of the voltage values of individual battery cells or the total voltage value is less than the minimum threshold voltage value). Here, the second state comprises charging the battery module 115 using the power limited DC charging signal and blocking the DC power signal to the DC-AC converter. In other words, the battery module 115 is charged only, and there is no discharge. In particular, the controller 116 is configured to open the first switch 125 in the second state then after 50 mS open the third switch 124. Switching in this manor limits the maximum current and voltage that the opening switch will be exposed to. Thus extending the life of the switch. When sufficient charge has been delivered to the battery module 115 switch 124 closes then after 2 seconds switch 125 closes returning to the first state.

The third state relates to a battery overvoltage condition (i.e. one or more of the voltage values of individual battery cells or the total voltage value is greater than the maximum threshold voltage value). The third state comprises blocking charging of the battery module 115 and routing the DC power signal to the DC-AC converter 118. In other words, the battery module 115 is discharged only, and there is no charging. In particular, the controller 116 is configured to open the second and third switch 126 and 124 in the third state, and 125 switch remain closed.

In the illustrated embodiment, the mobile power system 112 further comprises an AC distribution circuit 120 coupled to the DC-AC converter 118 and configured to deliver a plurality of AC signals respectively to a plurality of loads 111a-111e. The plurality of loads 111a-111e may have a cumulative power rating greater than 4.8 kW.

In the illustrated embodiment, the controller 116 comprises a battery management device configured to monitor a plurality of parameters related to the battery module 115. For example, the plurality of parameters may comprise a total voltage value, voltage values of individual battery cells (i.e. are in normal operating range), a temperature value, a SOC value, a SOH value, and a current value. The grid AC signal may comprise a 100-250 Volt AC signal, and the DC power signal may comprise a 40-59 Volt DC signal. The controller 116 also includes logic circuitry to control the state of the first, second, and third switches 124-126.

In the illustrated embodiment, the mobile power system 112 further comprises of a current monitor 147c configured to monitor current draw from the grid power connection 121, thereby preventing tripping a load protection element within the grid power connection (i.e. a circuit breaker). The plurality of current monitors 147a-147b is configured to monitor a current load going into the AC distribution circuit 120. Each of the plurality of current monitors 147a-147c comprises an active current monitor providing instant feedback to prevent excessive current draw.

Yet another aspect is directed to a method for making a mobile power system 112. The method includes coupling an AC-DC converter 117 configured to convert a grid AC signal to a power limited DC charging signal, and coupling a DC-AC converter 118 to the AC-DC converter. The method includes coupling a switching circuit 114 between a battery module 115, and the AC-DC converter 117 and the DC-AC converter 118. The battery module 115 configured to provide a DC power signal. The switching circuit 114 includes a first switch 125, and a first diode 128 coupled in parallel to the first switch. The method also comprises coupling a controller 116 to the battery module 115 and the switching circuit 114. The controller 116 is configured to selectively switch the switching circuit 114 between a first state and a second state. The first state concurrently charges the battery module 115 using the power limited DC charging signal and routes the DC power signal to the DC-AC converter 118, and the second state provides the DC power signal using the battery module without the power limited DC charging signal.

Advantageously, the mobile power system 112 permits the battery module 115 to handle all peak loads while a 120v variable amperage charger-transformer 121 sends a stream of constant current back into the system, supplementing the battery's usage. In an example embodiment/implementation of the mobile power system 112, over the course of a 6, 8, 10 hour work day, the charger increased the life of the battery module 115 by between 50-100%, depending largely on the air conditioning compressor's load.

Figure 3:
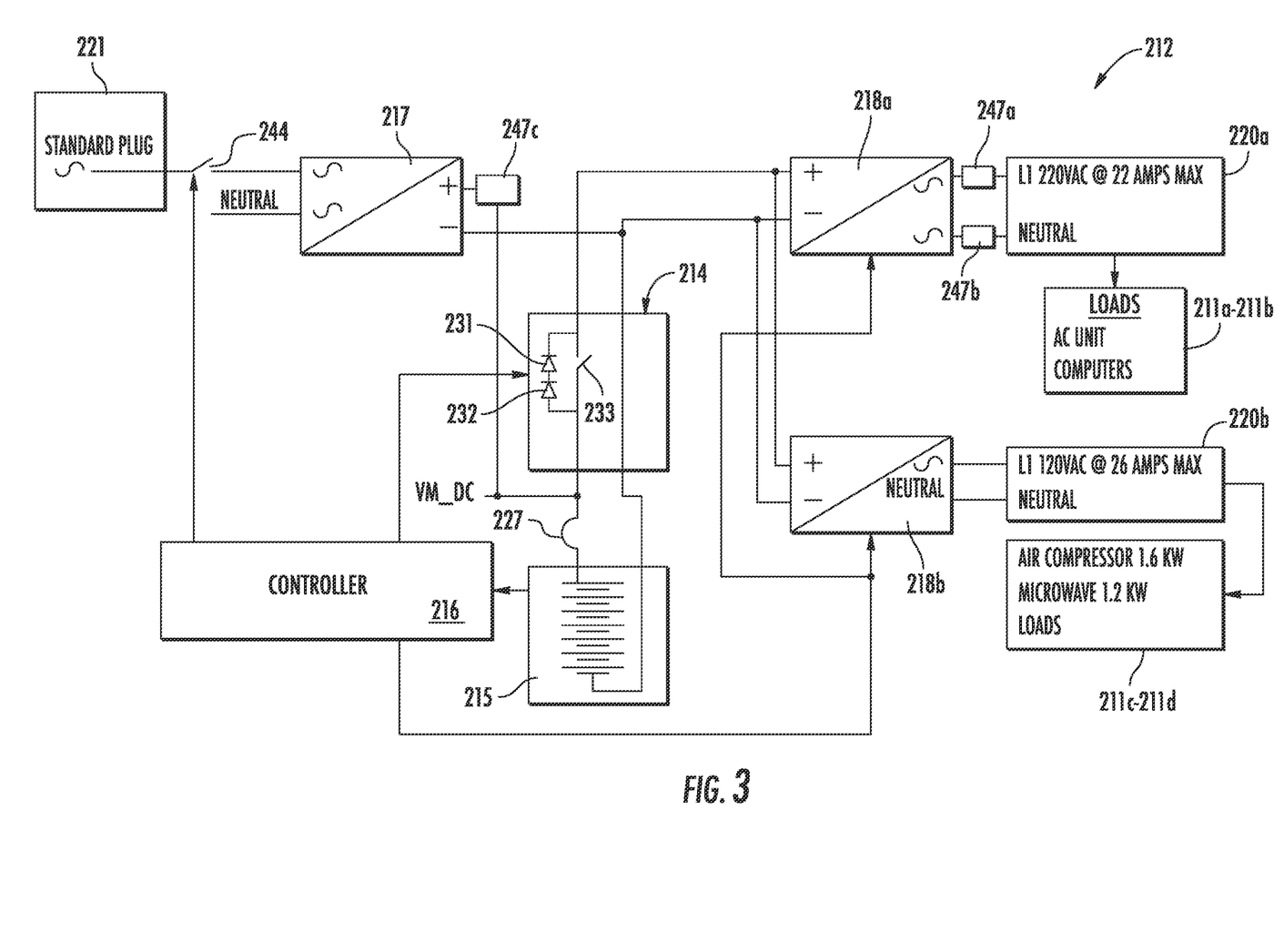
FIG. 3 is a schematic diagram of a mobile power system, according to a second embodiment the present disclosure.

Referring now additionally to FIG. 3, another embodiment of the mobile power system 212 is now described. In this embodiment of the mobile power system 212, those elements already discussed above with respect to FIGS. 1-2 are incremented by 200 and most require no further discussion herein. This embodiment differs from the previous embodiment in that this mobile power system 212 illustratively includes an AC-DC converter 217 configured to convert a grid AC signal to a power limited DC charging signal, and first and second DC-AC converters 218a-218b coupled to the AC-DC converter.

The mobile power system 212 illustratively includes a battery module 215 configured to provide a DC power signal, and a switching circuit 214 coupled between the battery module, and the AC-DC converter 217 and the first and second DC-AC converters 218a-218b. In this embodiment, the grid power connection 221 illustratively includes a standard 120 Volt AC plug (e.g. power limited to 13 Amp maximum or 1560 watts).

The mobile power system 212 illustratively includes a controller 216 coupled to the battery module 215, the switching circuit 214, and the first and second DC-AC converters 218a-218b. The controller 216 is configured to selectively switch the switching circuit 214 between a first state, a second state, a third state, and a fourth state. The first state includes one of concurrently charging the battery module 215 using the power limited DC charging signal and routing the DC power signal to the first and second DC-AC converters 218a-218b, or providing the DC power signal using the battery module 215 without the power limited DC charging signal, i.e. when grid power is unavailable. In other words, the first state relates to normal operation.

The switching circuit 214 illustratively includes a switch 233, a first diode 231, and a second diode 232. The first diode 231 and the second diode 232 are coupled in parallel to the switch 233. Additionally, the switching circuit 214 includes a current limiting element (e.g. 500 Amp fuse/circuit breaker) coupled between the battery module 215 and the second diode 232. The first diode 231 illustratively includes an anode terminal coupled to a cathode terminal of the second diode 232, i.e. they are coupled in series.

In the illustrated embodiment, the first DC-AC converter 218a is configured to generate a first AC power signal, and the second DC-AC converter 218b is configured to generate a second AC power signal. Here, the second AC power signal (e.g. 120 Volt AC) has a voltage level less than that of the first AC power signal (e.g. 220 Volt AC). The mobile power system 212 illustratively includes first and second AC distribution circuits 222a-220b respectively coupled to the first DC-AC converter and the second DC-AC converter 218a-218b.

Each of the first and second AC distribution circuits 220a-220b is configured to deliver a plurality of AC signals respectively to a plurality of loads 211a-211b & 211c-211d. For example, the plurality of loads 211a-211b & 211c-211d may have a cumulative power rating greater than 4.8 kW.

Also, in this embodiment, similar to the embodiment of FIG. 2, the controller 216 includes a battery management device configured to monitor a plurality of parameters related to the battery module. Also, the grid AC signal may include a 100-250 Volt AC signal, and the DC power signal may comprise a 12-17 Volt DC signal.

Also, the mobile power system 212 illustratively includes a cutoff switch 244 coupled to the controller 216. Depending on the values of the plurality of parameters (i.e. if a cell voltage is over the maximum threshold limit), the controller 216 may disconnect the grid AC signal. In other words, the controller 216 can island the mobile power system 212 if needed for safety.

The second state relates to a battery under voltage condition (i.e. one or more of the voltage values of individual battery cells or the total voltage value is less than the minimum threshold voltage value). Here, the second state comprises charging the battery module 215 using the power limited DC charging signal and disabling the first DC-AC converter and the second DC-AC converter 218a-218b. In particular, the controller 216 is configured to disable the first DC-AC converter and the second DC-AC converter 218a-218b so that the battery module 215 is recharged without any power draw to the plurality of loads 211a-211b & 211c-211d.

The third state relates to a battery overvoltage condition (i.e. one or more of the voltage values of individual battery cells or the total voltage value is greater than the maximum threshold voltage value). The third state comprises comprising blocking charging of the battery module 215 and routing the DC power signal to the first DC-AC converter and the second DC-AC converter 218a-218b. In other words, due to the current health state of the individual batteries in the battery module 215, the charge current into the battery module must be stopped. Here, the controller 216 is configured to open the cut-off switch 244, which isolates the mobile power system 212 from the grid power connection 221.

The fourth state relates to a supply over voltage for the first DC-AC converter and the second DC-AC converter 218a-218b. In particular, the first DC-AC converter and the second DC-AC converter 218a-218b each have a desired input DC voltage range. In some applications, particularly when the battery module 215 is fully charged and the cells have their highest charged voltage, the DC power signal outputted to the first DC-AC converter and the second DC-AC converter 218a-218b is greater than a desired range, and damage can result. In this state, the controller 216 is configured to cause the switch 233 to open. This prevents the battery module 215 from providing an over voltage condition to the DC-AC converters 218a-218b a voltage drop in the DC power signal is provided (via the first and second diodes 231, 232).

Yet another aspect is directed to a method for making a mobile power system 212. The method comprises coupling an AC-DC converter 217 configured to convert a grid AC signal to a power limited DC charging signal, coupling first and second DC-AC converters 218a-218b to the AC-DC converter, and coupling a battery module 215 configured to provide a DC power signal. The method further comprises coupling a switching circuit 214 between the battery module 215, and the AC-DC converter 217 and the first and second DC-AC converters 218a-218b. The switching circuit 214 includes a switch 233, a first diode 231, and a second diode 232 coupled in parallel to the switch. The method includes coupling a controller 216 to the battery module 215, the switching circuit 214, and the first and second DC-AC converters 218a-218b. The controller 216 is configured to selectively switch the switching circuit 214 between a first state and a second state. The first state includes concurrently charging the battery module 215 using the power limited DC charging signal and routing the DC power signal to the first and second DC-AC converters 218a-218b, and the second state provides the DC power signal using the battery module 215 without the power limited DC charging signal. Advantageously, this embodiment may be less expensive to manufacture, and has reduced size, and weight however it is the lest effect of embodiments due to 100% of the power goes through the AC-DC converter 217 and the DC-AC converters 218a-218b plus when the battery is charged more loss is incurred from the voltage dropping diodes 231-232.

Figure 4:
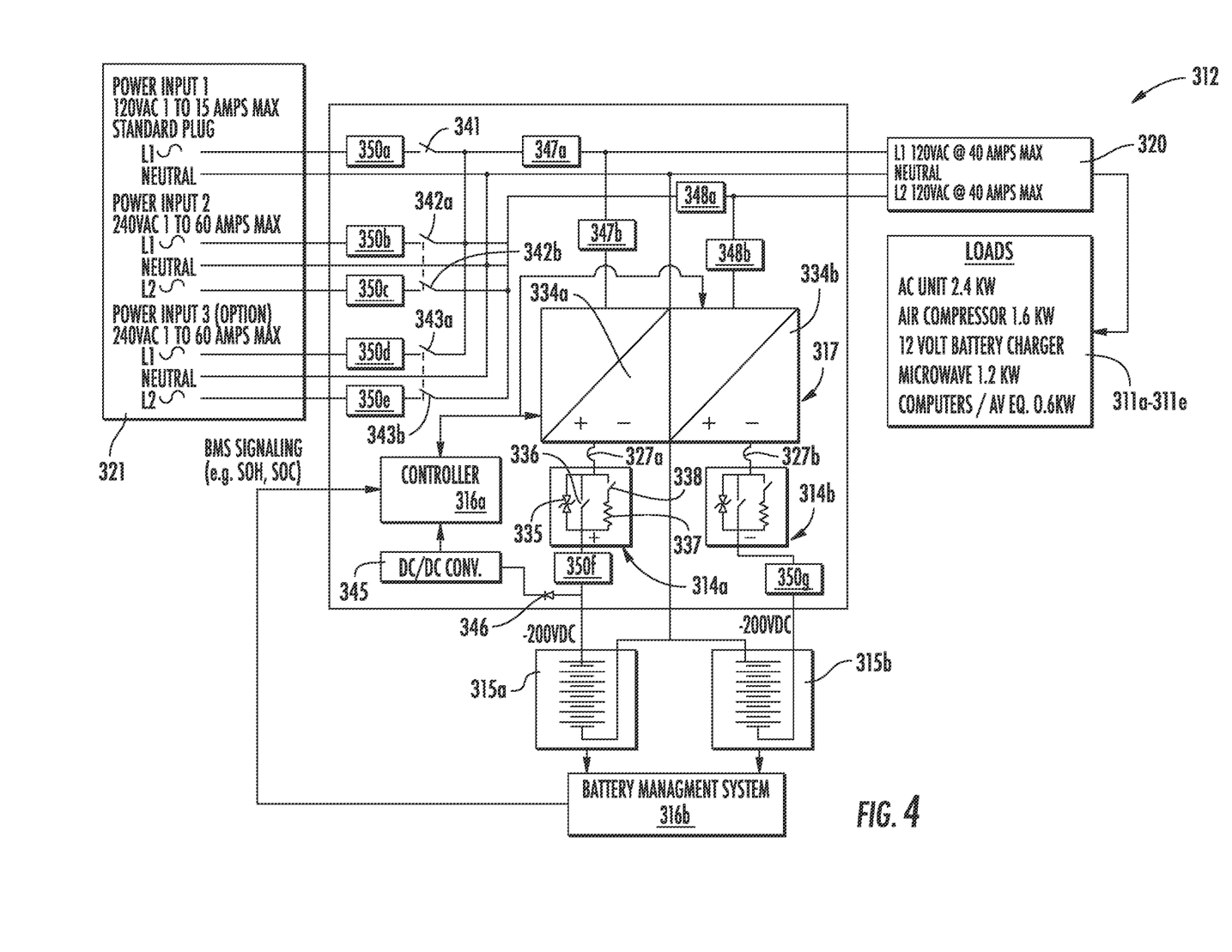
FIG. 4 is a schematic diagram of a mobile power system, according to a third embodiment the present disclosure.

Referring now additionally to FIG. 4, another embodiment of the mobile power system 312 is now described. In this embodiment of the mobile power system 312, those elements already discussed above with respect to FIGS. 1-3 are incremented by 300 and most require no further discussion herein. This embodiment differs from the previous embodiment in that this mobile power system 312 illustratively includes a bidirectional AC-DC converter 317 configured to convert a grid AC signal to a power limited DC charging signal with a threshold level (e.g. limited by a circuit breaker associated with the grid AC signal, such as a 15 amp maximum being the threshold level), and a battery module configured to provide a DC power signal. In this embodiment, the battery module comprises first and second battery modules 315a-315b.

The mobile power system 312 illustratively includes first and second switching circuits 314a-314b coupled between the first and second battery modules 315a-315 and the bidirectional AC-DC converter 317. The mobile power system 312 illustratively includes a controller 316a-316b coupled to the first and second battery modules 315a-315b and the first and second switching circuits 314a-314b.

The controller 316a-316b is configured to selectively switch the bidirectional AC-DC converter 317 between a first state, a second state, a third state, and a fourth state. The first state includes, when a load power level is less than the threshold level, concurrently charging the first and second battery modules 315a-315b using the power limited DC charging signal and delivering the grid AC signal to a plurality of loads 311a-311e. The second state includes, when the load power level is greater than the threshold level, concurrently converting the DC power signal with the bidirectional AC-DC converter 317 into a battery AC signal for delivery to the plurality of loads 311a-311e, and delivering the grid AC signal to the plurality of loads. The third state comprises, when the first and second battery modules 315a-315b are fully charged, and when the load power level is less than the threshold level, delivering the grid AC signal to the plurality of loads 311a-311e and placing the bidirectional AC-DC converter 317 in a stand-by state. The fourth state comprises when the power limited DC charging signal is unavailable, converting the DC power signal with the bidirectional AC-DC converter 317 into the battery AC signal for delivery to the plurality of loads 311a-311e.

Each of the first switching circuit 314a and the second switching circuit 314b illustratively includes a first switch 336, and a diode pair 335 coupled in parallel to the first switch. Each diode of the diode pair 335 comprises a Zener diode, each having respective cathode terminals coupled together. As will be appreciated, the diode pair 335 is coupled as a waveform clipping device. Also, it should be appreciated that the diode pair 335 may be omitted in some embodiments.

More specifically, each of the first switching circuit 314a and the second switching circuit 314b comprises a second switch 338 and a resistor 337 coupled in series, and the second switch and the resistor are coupled in parallel to the first switch 336. Each of the first switching circuit 314a and the second switching circuit 314b illustratively includes a current limiting element 327a-327b (e.g. a 30 Amp fuse/circuit breaker) coupled between the first and second battery modules 315a-315b and the first switch 336.

The mobile power system 312 illustratively includes an AC distribution circuit 320 coupled to the bidirectional AC-DC converter 317 and configured to deliver a plurality of AC signals respectively to the plurality of loads 311a-311e. The plurality of loads 311a-311e may have a cumulative power rating greater than 9.6 kW.

Also, as in the embodiments of FIGS. 2-3, the controller 316a-316b includes a battery management device 316b configured to monitor a plurality of parameters related to the first and second battery modules 315a-315b. In the illustrated embodiment, the first and second battery modules 315a-315b may provide a total power storage of 10-16 kWh. In this embodiment, the controller 316a and the battery management device 316b are depicted as separate circuits, but in other embodiments, the circuits may be integrated. The grid AC signal may include a 100-250 Volt AC signal, and the DC power signal may comprise a +/−170-227 Volt DC signal, i.e. 314-454 in total.

In this embodiment, the grid power connection 321 illustratively includes a plurality of power inputs providing a corresponding plurality of grid AC signals. Here, the plurality of grid AC signals comprise first and second 240 Volt AC signals (1-50 Amps), and a 120 Volt AC grid AC signal (1-13 Amps). In some embodiments, one or more of the plurality of grid AC signals can be omitted for power source simplification.

The bidirectional AC-DC converter 317 illustratively includes first and second power blocks 334a-334b. The first and second power blocks 334a-334b are independent power blocks. The first power block 334a is selectively coupled to one or more of the first and second 240 Volt AC signals, and the 120 Volt AC grid AC signal. The second power block 334b is selectively coupled to one or more of the first and second 240 Volt AC signals. Because of the independence of the first and second power blocks 334a-334b, the mobile power system 312 can utilize multiple grid power standards with varying phases and voltages simultaneously.

Also, the mobile power system 312 illustratively includes a plurality of input cutoff switches 341, 342a-342b, 343a-343b for each grid AC signal. If operational or safety concerns necessitate opening of these cutoff switches 341, 342a-342b, 343a-343b, the controller 316a-316b can deactivate (i.e. place in an open state) any one or more of the cutoff switches.

In the off state, the controller 316a-316b is configured to cause the first switch 336, the second switch 338, and the plurality of input cutoff switches 341, 342a-342b, 343a-343b are all set to an open state. When the mobile power system 312 is powered up, the controller 316a-316b is configured to review the DC supplies available, if the DC supply is in the proper voltage range the second switch 338 is closed, then after a delay, the first switch 336 is closed and the second switch is opened. This method limits the DC inrush current. Once the first switch 336 is closed, the controller 316a-316b is configured to review the AC supplies available (both voltages and the phases) from the grid power connection 321 and selectively control the plurality of input cutoff switches 341, 342a-342b, 343a-343b to provide the most efficient power source.

Helpfully, the mobile power system 312 includes safeguards for safety, which will shut down once certain parameters are reached. In the event that grid AC power is turned off, the grid AC power is disconnected so that power cannot be sent out through the charging cord, and the first and second battery modules 315a-315b will simply discharge until they reach a minimum power level limit, shut off, and wait to be charged again. In the event of a power outage, when the input source stops supplying and starts demanding a load (e.g. when a local transformer fails in a storm), the bidirectional AC-DC converter 317 instantaneously shuts down the system, disconnects the AC source so power cannot be sent out through the charging cord, and then brings the system back up. This is all accomplished within 50 milliseconds, allowing for all systems on the mobile vehicle platform to stay powered on and functional. Also, there is surge protection built into the bidirectional AC-DC converter 317.

Also, the mobile power system 312 illustratively includes a DC-DC converter 345, and a diode 346 coupled to the DC-DC converter. The DC-DC converter 345 comprises a step-down converter, which can provide a lower voltage power source for the controller. The diode 346 is coupled between the first switching circuit 314a and the first battery module 315a.

Yet another aspect is directed to a method for making a mobile power system 312. The method comprises coupling a bidirectional AC-DC converter 317 configured to convert a grid AC signal to a DC power limited charging signal, coupling a battery module 315a-315b configured to provide a DC power signal, and coupling a controller 316a-316b to the battery module and the bidirectional AC-DC converter and configured to selectively switch the bidirectional AC-DC converter between a first state and a second state. The first state may include, when a load power level is less than the threshold level, concurrently charging the battery module 315a-315b using the power limited DC charging signal and delivering the grid AC signal to the plurality of loads 311a-311e. The second state may comprise, when the load power level is greater than the threshold level, concurrently converting the DC power signal with the bidirectional AC-DC converter 317 into a battery AC signal for delivery to the plurality of loads 311a-311e, and delivering the grid AC signal to the plurality of loads.

In any of the mobile power system embodiments 112, 212, 312 noted herein, one or more of the described components may be carried on one or more circuit boards. Indeed, in some advantageous embodiments, the mobile power system could comprise a single circuit board with various integrated circuit components thereon.

In these circuit board embodiments, due to the high current nature of mobile power applications, current may need to be routed off chip or off the board, and not via conductive traces on the circuit board. In these applications, the one or more circuit board include openings adjacent active components on the circuit boards, and the mobile power system would include a plurality of bus bars (e.g. copper bus bar) extending under the circuit board. Each bus bar would include one or more connection posts to extend through the openings for connection to the active components on the circuit board (e.g. soldering).

Advantageously, the mobile power system 312 is substantially more efficient than existing approaches for power conversion. Indeed, this embodiment is more efficient than the embodiments depicted in FIGS. 2-3. This is due to the elimination of the multiple AC-DC converters, step-down transformers, and rectifiers. The bidirectional AC-DC converter 317 directs grid AC power without interruption into the mobile vehicle platform, while the first and second battery modules 315a-315b handle all loads in excess of the grid AC power limit.

The mobile power system 312 illustratively includes a plurality of current monitors 347a-347b, 348a-348b, and a plurality of voltage monitors 350a-350g. Each of the plurality of current monitors 347a-347b, 348a-348b passes a current value to the controller 316a-316b. Each of the plurality of voltage monitors 350a-350g passes a voltage value to the controller 316a-316b.

In some embodiments, additional voltage monitors are located adjacent the current monitors 347b, 348b, and the current limiting elements 327a-327b. The controller 316a-316b uses these current/voltage values to monitor the real-time load demands and to efficiently route energy in accordance with a plurality of operational states. The plurality of operational states comprises:

1. directing energy from the grid power connection 321 to a balanced combination of the plurality of loads 311a-311e and the first and second battery modules 315a-315b (load demands are less than maximum grid power; the first state);
2. directing energy from the grid power connection 321 to only the plurality of loads 311a-311e and directing energy concurrently from the first and second battery modules 315a-315b to the plurality of loads 311a-311e (load demands are greater than maximum grid power; combined power mode, second state).
3. directing energy from the grid power connection 321 only to the plurality of loads 311a-311e, and placing the bidirectional AC-DC converter 317 into a stand-by mode (load demands meet maximum grid power; or when the first and second battery modules 315a-315b are fully charged and load demands are less than or equal to maximum grid power);
4. grid power connection 321 not available or indicates an error/problem state, energy from the first and second battery modules 315a-315b is directed to the plurality of loads 311a-311e, and the bidirectional AC-DC converter 317 is disconnected from the grid power connection (battery power only mode; fourth state).
5. directing energy from the grid power connection 321 only to the first and second battery modules 315a-315b (load demands are near zero; charging mode, e.g. under voltage condition);
6. when the bidirectional AC-DC converter 317 or the first and second battery modules 315a-315b generate an error message, directing energy from the grid power connection 321 only to the plurality of loads 311a-311e and electrically floating the bidirectional AC-DC converter and the first and second battery modules (bypass mode, error state); and
7. the controller 316a-316b causes the first switch 336, the second switch 338, and the plurality of input cutoff switches 341, 342a-342b, 343a-343b are all set to an open state (off state).

If the mobile vehicle platform power load drops below that a limit, power is diverted into the first and second battery modules 315a-315b for recharging. If the first and second battery modules 315a-315b are full, then the load requested of the shore power is below its limit. In efficient fashion, the bidirectional AC-DC converter 317, in real time, directs or balances the energy from the grid AC signal into the first and second battery modules 315a-315b for charging and into the AC distribution circuit 320 for driving the needed plurality of loads 311a-311e.

The mobile power system 312 may achieve an approximate 97% energy efficiency when converting voltages AC-DC or DC-AC. Also, since only a factional amount of the total energy is put though conversion, further efficiency is achieved. This gain in conversion efficiency directly correlates to a gain in battery life and grid AC efficiency. Additionally, it simultaneously reduces the heat load, which in turn reduces the energy demand from the air conditioning compressor needed maintain a comfortable temperature. These represent significant energy savings. Finally, the mobile power system 312 is exceptionally small, reducing the cubic footprint and weight.

Other features relating to mobile power systems are disclosed in co-pending applications: titled "MOBILE POWER SYSTEM WITH MULTIPLE CONVERTERS AND RELATED PLATFORMS AND METHODS," U.S. patent application Ser. No. 16/701,456; and titled "MOBILE POWER SYSTEM WITH MULTIPLE DC-AC CONVERT- ERS AND RELATED PLATFORMS AND METHODS," U.S. Pat. No. 11,070,073, all incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A power system comprising:
a converter circuit configured to convert a grid alternating current (AC) signal to a direct current (DC) charging signal with a threshold level;
a power storage module configured to provide a DC power signal;
a controller coupled to the power storage module and the converter circuit and configured to selectively switch the converter circuit between a first state and a second state; and
at least one switching circuit coupled between the power storage module and the converter circuit and comprising
a first switch, and
a diode pair coupled in parallel to the first switch, each diode of the diode pair having respective cathode terminals coupled together;
the first state comprising, charging the power storage module using the DC charging signal and delivering the grid AC signal to a load;
the second state comprising converting the DC power signal with the converter circuit into a battery AC signal for delivery to the load, and delivering the grid AC signal to the load.

2. The power system of claim 1 wherein the controller is configured to selectively switch the converter circuit between a third state, and a fourth state; wherein the third state comprises, delivering the grid AC signal to the load and placing the converter circuit in a stand-by state; and wherein the fourth state comprises converting the DC power signal with the converter circuit into the battery AC signal for delivery to the load.

3. The power system of claim 1 wherein the at least one switching circuit comprises first and second switching circuits coupled between the power storage module and the converter circuit.

4. The power system of claim 3 wherein the diode pair comprises a pair of Zener diodes.

5. The power system of claim 3 wherein each of the first switching circuit and the second switching circuit comprises a second switch and a resistor coupled in series; and wherein the second switch and the resistor being coupled in parallel to the first switch.

6. The power system of claim 5 wherein each of the first switching circuit and the second switching circuit comprises a current limiting element coupled between the power storage module and the first switch.

7. The power system of claim 1 wherein the load comprises a plurality of loads; and further comprising an AC distribution circuit coupled to the converter circuit and configured to deliver a plurality of AC signals respectively to the plurality of loads.

8. The power system of claim 1 wherein the controller comprises a battery management device configured to monitor a plurality of parameters related to the power storage module.

9. The power system of claim 8 wherein the plurality of parameters comprises a total voltage value, voltage values of individual battery cells, a temperature value, a state of charge (SOC) value, a state of health (SOH) value, and a current value.

10. A power system comprising:
a converter circuit configured to convert a grid alternating current (AC) signal to a direct current (DC) charging signal with a threshold level;
a power storage module configured to provide a DC power signal;
a controller coupled to the power storage module and the converter circuit and configured to selectively switch the converter circuit between a first state, a second state, a third state, and a fourth state; and
first and second switching circuits coupled between the power storage module and the converter circuit, each switching circuit comprising
a first switch, and
a diode pair coupled in parallel to the first switch, each diode of the diode pair having respective cathode terminals coupled together;
the first state comprising charging the power storage module using the DC charging signal and delivering the grid AC signal to a load;
the second state comprising converting the DC power signal with the converter circuit into a battery AC signal for delivery to the load, and delivering the grid AC signal to the load;
the third state comprising delivering the grid AC signal to the load and placing the converter circuit in a stand-by state; and
the fourth state comprising converting the DC power signal with the converter circuit into the battery AC signal for delivery to the load.

11. The power system of claim 10 wherein the diode pair comprises a pair of Zener diodes.

12. The power system of claim 10 wherein each of the first switching circuit and the second switching circuit comprises a second switch and a resistor coupled in series; and wherein the second switch and the resistor being coupled in parallel to the first switch.

13. The power system of claim 12 wherein each of the first switching circuit and the second switching circuit comprises a current limiting element coupled between the power storage module and the first switch.

14. The power system of claim 10 wherein the load comprises a plurality of loads; and further comprising an AC distribution circuit coupled to the converter circuit and configured to deliver a plurality of AC signals respectively to the plurality of loads.

15. The power system of claim 10 wherein the controller comprises a battery management device configured to monitor a plurality of parameters related to the power storage module.

16. The power system of claim 15 wherein the plurality of parameters comprises a total voltage value, voltage values of individual battery cells, a temperature value, a state of charge (SOC) value, a state of health (SOH) value, and a current value.

17. A method for making a power system, the method comprising:
- coupling a converter circuit configured to convert a grid alternating current (AC) signal to a direct current (DC) charging signal with a threshold level;
- coupling a power storage module configured to provide a DC power signal;
- coupling a controller to the power storage module and the converter circuit and configured to selectively switch the converter circuit between a first state and a second state; and
- coupling at least one switching circuit between the power storage module and the converter circuit, the at least one switching circuit comprising
  - a first switch, and
  - a diode pair coupled in parallel to the first switch, each diode of the diode pair having respective cathode terminals coupled together;
- the first state comprising charging the power storage module using the DC charging signal and delivering the grid AC signal to a load;
- the second state comprising converting the DC power signal with the converter circuit into a battery AC signal for delivery to the load, and delivering the grid AC signal to the load.

18. The method of claim 17 wherein the controller is configured to selectively switch the converter circuit between a third state, and a fourth state; wherein the third state comprises delivering the grid AC signal to the load and placing the converter circuit in a stand-by state; and wherein the fourth state comprises converting the DC power signal with the converter circuit into the battery AC signal for delivery to the load.

19. The method of claim 17 wherein the at least one switching circuit comprises first and second switching circuits between the power storage module and the converter circuit.

20. The method of claim 19 wherein each of the first switching circuit and the second switching circuit comprises a second switch and a resistor coupled in series; and wherein the second switch and the resistor being coupled in parallel to the first switch.

* * * * *